Figure 1:
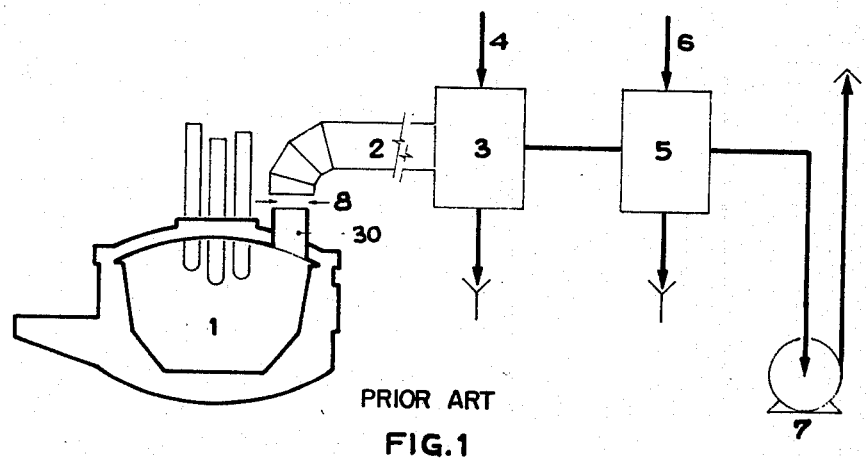

United States Patent [19]

Rinaldi

[11] 3,988,421
[45] Oct. 26, 1976

[54] GAS CLEANING PROCESS AND EQUIPMENT

[75] Inventor: Noè Ugo Rinaldi, Soresina (Cremona), Italy

[73] Assignee: Tecnochim S.r.l., Milan, Italy

[22] Filed: Apr. 26, 1973

[21] Appl. No.: 354,919

[30] Foreign Application Priority Data
May 10, 1972 Italy .................................. 24127/72

[52] U.S. Cl. ............................... 423/210; 423/246; 423/215.5; 75/41; 75/60; 23/277 C; 266/146; 266/157
[51] Int. Cl.² ........................................ B01D 53/34
[58] Field of Search ................. 423/246, 210, 215.5; 75/60, 41; 266/15, 16, 35; 261/DIG. 54, DIG. 9, 17; 23/277 C

[56] References Cited
UNITED STATES PATENTS

| | | | |
|---|---|---|---|
| 2,833,615 | 5/1958 | Kollgaard | 423/210 Y |
| 3,372,917 | 3/1968 | Richardson | 266/15 |
| 3,411,864 | 11/1968 | Pallinger | 423/210 |
| 3,567,399 | 3/1971 | Altmann et al. | 23/277 C |
| 3,655,361 | 4/1972 | Brown | 261/DIG. 54 |
| 3,695,192 | 10/1972 | Von Brimer | 23/277 C |
| 3,797,240 | 3/1974 | Inoue et al. | 23/277 C |
| 3,817,712 | 6/1974 | Wentworth | 423/210 X |
| 3,838,974 | 10/1974 | Hemsath et al. | 423/246 X |

*Primary Examiner*—Earl C. Thomas
*Attorney, Agent, or Firm*—Cushman, Darby & Cushman

[57] ABSTRACT

A process and an apparatus for the cleaning of combustible gases, particularly gases emitted in steel making plants, in which the gases are passed through a collecting duct together with additional air at conditions such as to cause the combustion of the combustible components of the gas with a reduced flame length, the said air being supplied as a double feed so as to give a protecting effect of the duct inner walls, and then the gases are saturated with water and washed, the saturation taking place by a countercurrent flow of the gases and of the saturating water, and the washing takes place by means of a Venturi scrubber, outside of the saturating tower and in which the saturated gases are recycled to the saturating stage, a pre-separation of liquid particles taking place downstream of the Venturi scrubber and upstream of the saturator, and lastly the gases are discharged to the atmosphere.

3 Claims, 9 Drawing Figures

Sez. y-y

SEZ. x-x

SEZ. X-X

GAS CLEANING PROCESS AND EQUIPMENT

This invention relates to the cleaning of gas being at least partially combustible and containing powders, with particular regard to those developed in the steel making.

As well known, in the production of steels with oxygen, the reduction of the carbon content to the required values and the elimination of other undesirable elements, such as phosphor, silicon and manganese, etc. is effected by injecting oxygen into the molten bath ( possibly mixed with other gases, such as argon), which partly oxidizes carbon at CO and CO2 and partly forms phosphor, silicon, chromium, manganese, iron oxides, etc., which may thus be separated in form of lags.

During the oxygen introduction phase, there is therefore the development of considerable quantities of gas at high temperatures, consisting essentially of CO and CO2 (in variable proportions depending on the production process), which together with other gases, such as nitrogen and argon flow off the furnace, carrying appreciable quantities of metal powders and vapors.

One of the most prevalent problems is that to avoid the pollution of the environment for both diffusion of such powders and the possible presence of sharp quantities of carbon oxide in the exhaust gas.

In FIG. 1 (which is a schematical view partly in section) there is represented a sequence of the steps which, in conformity with the conventional technique, are customarily taken in order to attenuate the pollution.

The hot gas developed in the furnace outflows from the opening 30, is sucked in through the duct 2, which is provided with special water circulation cooling jacket, cooled and saturated by water injection 4 in the saturator 3, washed with additional water 6 in the Venturi scrubber 5 and discharged to the atmosphere via the fan 7.

Together with the gas having developed in the furnace 1 there is sucked from the slot 8 at the end of the duct 2 a quantity of air being greatly in excess over the quantity required for combustion of CO to $CO_2$ with a view to reducing the gas temperature along the duct 2.

Amongst the major inconveniences incidental to the conventional processing we may quote the following :

a. an excessive length of the flame due to the bad mixing of the air sucked through 8 and the gas outflowing from the opening 30, which involves the need for the duct 2 to be very long and for ensuring the elimination of CO. Normally speaking, the length of the duct 2 is equal to 10 to 12 diameters of the duct.

b. growth of very hard incrustations on the inner surface of the duct 2, which require a frequent and expensive maintenance. The growth of these incrustations is due to the presence of unburnt CO which reduces to metal the oxide powders exiting from the furnace, and to the presence of metal non oxidized vapours which are condensed on the inner wall of the duct, the latter being kept cold by the water circulation inside the jacket.

c. exceedingly high consumption of power of the fan 7 owing to the high air excess which must be sucked at the slot 8 in order to ensure the combustion of the gas in the duct 2.

Figure 2:
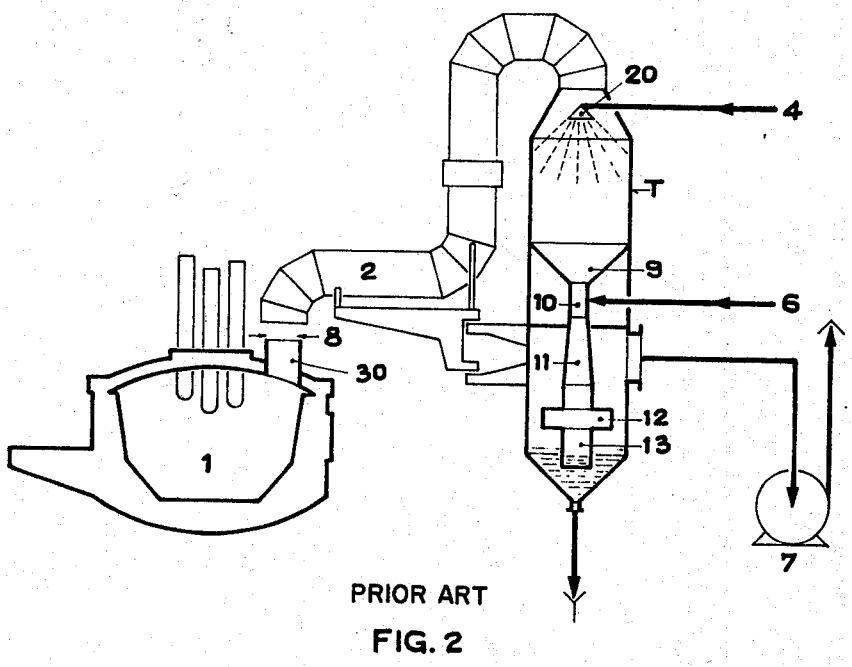

In FIG. 2, which is still a schematical front view partially in section there is represented one of the most currently used embodiment forms of equipment performing the operations outlined in FIG. 1. The gas outflowing from the furnace 1 via the opening 30 is brought by the complex duct 2 to the head of the tower T, where it is sprayed with water outflowing from one or more nozzles 20; it flows then to the Venturi scrubber, formed by the converging part 9, the throat 10 (with injection of water 6), the diffuser 11 and the liquid separator 12-13 (see for example Italian Pat. No. 885 662).

It has now been found that the prior art operations and equipment may be substantially improved by a critical combination of measures whereby several advantages may be simultaneously attained, amongst which the following may be mentioned:

A. The complete gas combustion is performed in a duct 2 of most reduced length;

B. the gas saturation is carried out in counter or cross current with the saturation liquid;

C. the separation of the washing liquid is performed in two stages without the intervention of additional mechanical means.

The process of this invention is characterized in that the gas combustion is effected in the collecting duct with most reduced flame length and efficient protection of the inner walls of said duct due to a special double air feed, in one of which the air receives a rotary motion with the axis coinciding with the duct axis. Further feed air may be introduced either via nozzles being substantially orthogonal to the duct axis ( or the axis of its connection) or via a pipe running parallel to the axis of the combustion duct.

Said pipe is preferably external to the connection of the duct and is provided with an air distributor.

According to the present invention, in order to advantageously effect the washing of the thus burnt gas, the latter is caused to flow into the lower portion of the tower section acting as saturator in counter-current or crossed current to the excess saturation and prewashing liquid, the thus treated gas is removed from the upper portion of said section and caused to flow through a Venturi scrubber, placed outside the tower containing the saturator, the gas outflowing from said scrubber is returned to the tower section acting as separator such as to undergo at first a deviation causing a pre-separation of the liquid particles and then a cyclonic centrifugation without auxiliary mechanical means, leading to the complete separation of the finest particles and that finally the excess saturation water is collected in a lower section so as to build the hydraulic seal.

The invention also includes an equipment to perform the aforementioned process, which is characterized in that it consists of a furnace, a short collecting and combustion duct of the gas outflowing from the furnace, and two combustion air feed means one of which is made up of a crown fitted with vanes.

In one embodiment, the equipment includes a tower the axis of which is substantially orthogonal to the axis of said gas collecting and combustion duct, a saturation section on the upper part of said tower, an inlet for gases in the lower part of said saturation section from the upper part of which the excess water falls substantially in counter-current to the gas flow, an outlet for the treated gases, which is situated on the upper part of said saturation section and connected to a Venturi scrubber, placed externally and parallel to said tower, a washing liquid separation section formed in the lower part of said tower, a joint with accentuated elbow between the outlet of the Venturi scrubber and an inlet in said separation area, a funnel-like organ with most extended pipe placed in the tower between said upper saturation section and said lower separation section, and an opening in the latter section for connection to the exhaust fan.

Figure 3:
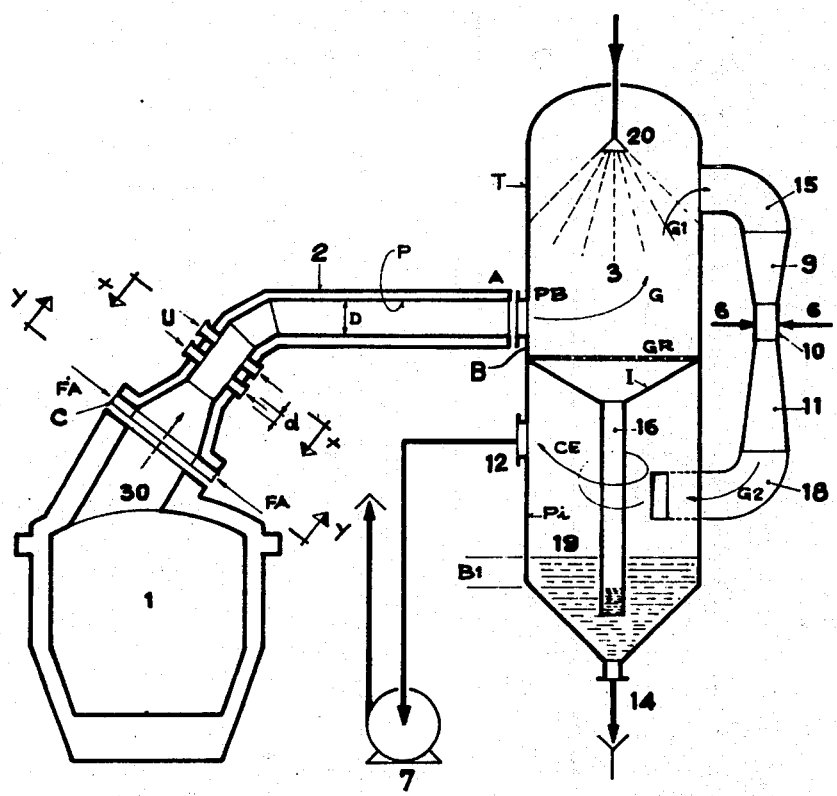
Figure 4:
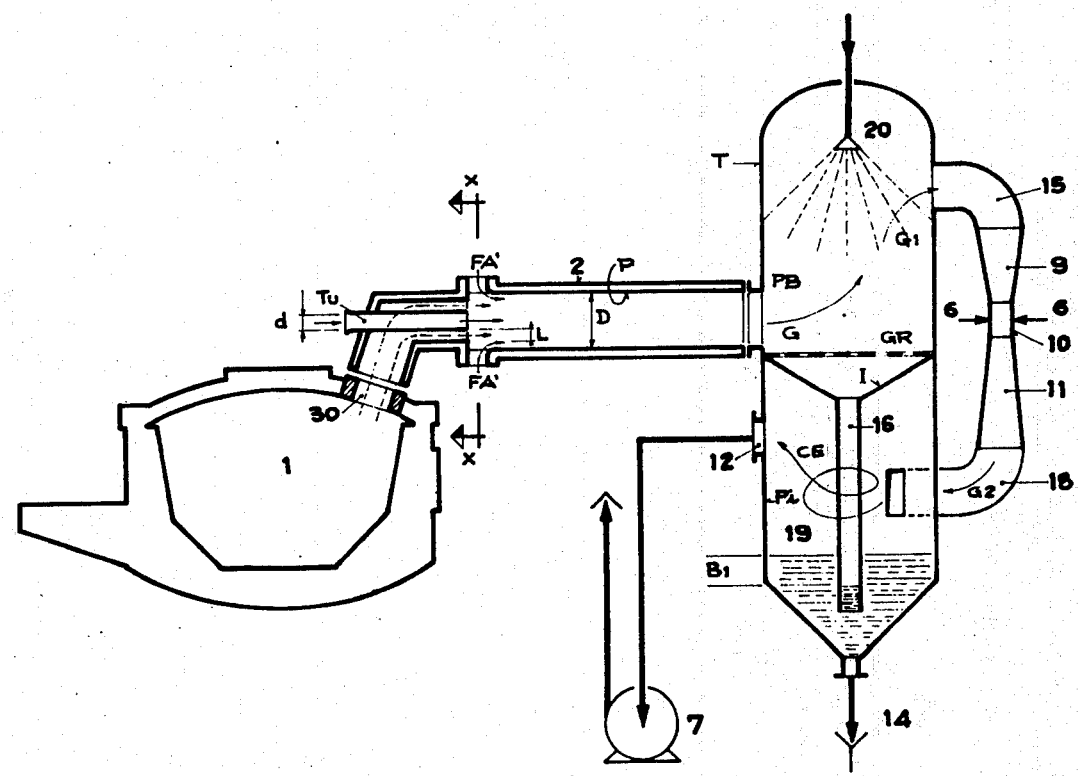
Figure 4A:
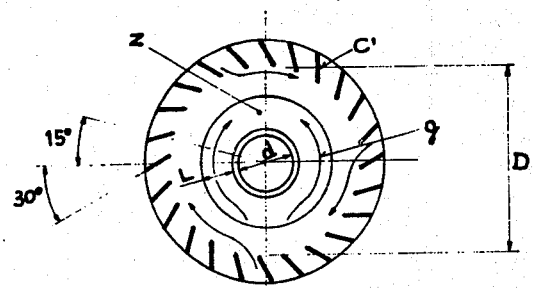
Figure 5:
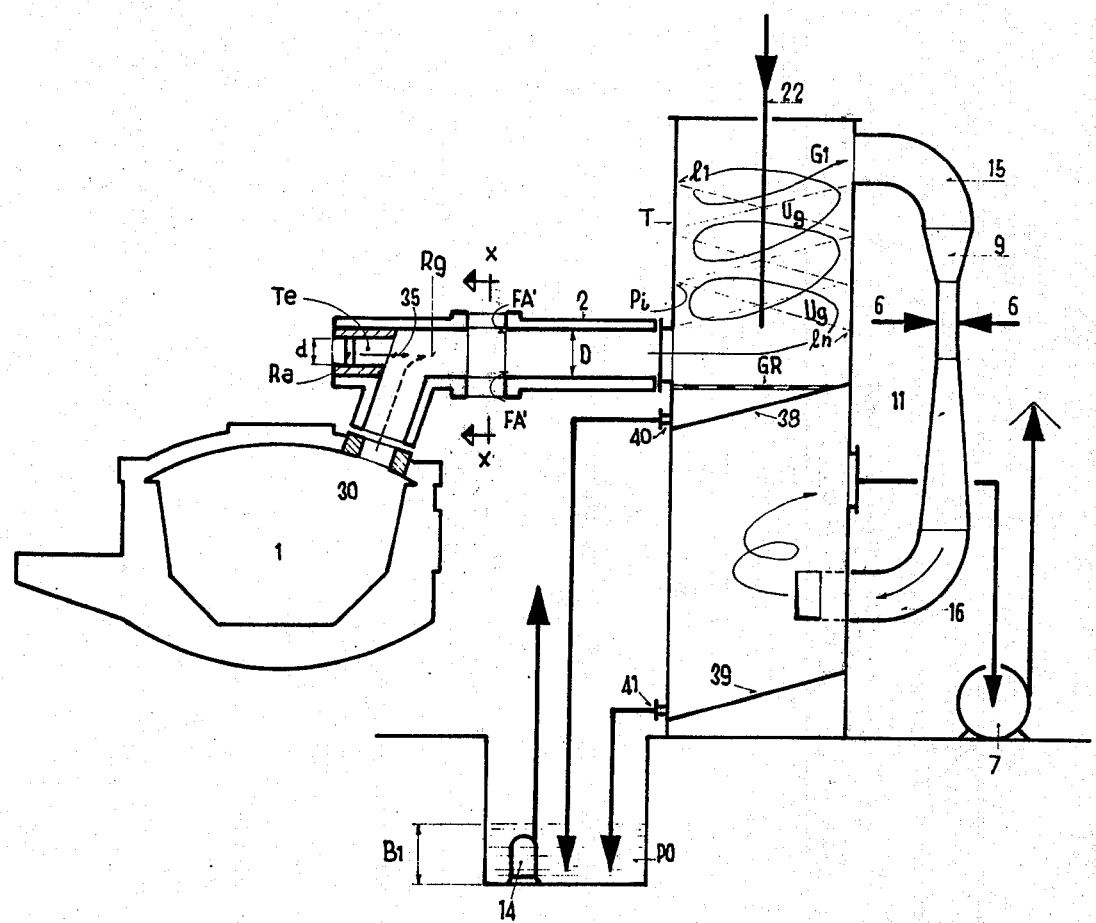
Figure 5A:
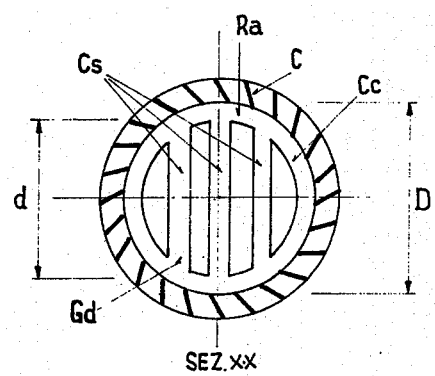

In another embodiment, the duct feeds tangentially into the tower the upper portion of which is crossed by a pipe spraying water in crossed current to the gases which flow upwardly in a spiral path. This tower section is like a cyclonic scrubber. The invention will now be described with reference to some preferred but non-limiting embodiment forms as represented in FIGS. 3, 4 and 5, which are schematic views partially in section (similar to FIG. 2) while FIGS. 3a, 4a, and 5a are cross-sections of an air feed, FIG. 3b being the cross-section of the other air feed. Like reference characters designate like parts in the several figures.

As may be seen from FIGS. 3 and 4 the gas outflowing from the furnace 1 via the mouth 30 is sucked by the fan 7 into the short duct 2. Said duct 2 shows two essential features :

1. at its portion being most close to the furnace 1 it is provided with a double air feed,
2. at its end A the combustion duct 2 is attached in substantially an orthogonal direction to the lower portion B of the saturator 3 of the tower T so that the water outflowing from the nozzles 20 meets with the gas G in counter-current relationship.

The same gas G (cooled, saturated and pre-washed) passes now (following the arrow G1) through the elbow 15 into the Venturi scrubber 9-10-11, characteristically placed outside the tower T : at 10 other water 6 flows for the end washing.

According to another typical feature of the invention, the fully washed gas G2 outflowing from the Venturi scrubber is being returned to the tower T under critical conditions, so that at first there occurs in the elbow 18 a separation of the coarsest liquid particles and then the entering of G2 in T takes place in substantially a tangential manner to the inner walls of T. In this manner the gas G2 is given a helical motion designated by CE, causing a cyclonic centrifugation of the finer droplets against the inner walls Pi of the separator 19.

According to a further feature of the invention, the water injected through the nozzles 20 is in excess of the quantity required for the gas saturation so as to accomplish a first washing stage of the powders contained in the gas itself. The water excess taking along the powders beaten down in the first stage collects on the funnel bottom I of the upper section 3 and flows through a pipe 16 plunging into the bottom of the lower section 19, where a water ram B1 is maintained, which is sufficient to build the gas hydraulic seal. All the water collecting on the bottom of the separator 19 may thus be removed by one single pump via 14.

For the stopping of any coarse solid parts occurring in the gas one may arrange a grid GR on the funnel I.

Another appreciable feature of the invention is represented by the feed system of the combustion air to the collecting duct 2, made so as to substantially reduce the length and to avoid the formation of scales on the walls of 2.

It has been found that preferably for gases having a CO content at least equal or superior to 50% by volume, in the initial portion of the duct 2 of diameter D it is advisable to use an adequate number of radial nozzles U of diameter "d" through which combustion air in an almost stoichiometric quantity flows.

As may be seen in FIG. 3a, which is a section of FIG. 3 with a plane taken through the line x—x, the nozzles U are disposed with the axis being substantially perpendicular to the axis of the duct 2 and are distributed along one or more circumferential crowns, in a number of 3 to 18 nozzles per crown, and have such an inside diameter $d$ that the ratio $d/D$ is comprised between 0.05 and 0.25.

Through the annular slot FA is further sucked in a certain quantity of air, acting as protection for the inner walls P of the duct 2 in the area being occupied by the combustion.

Figure 3B:
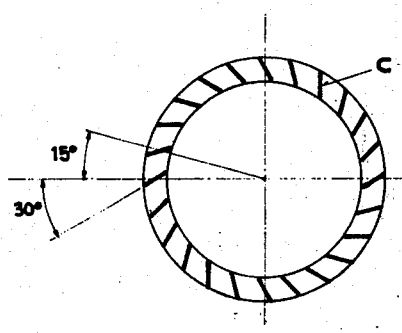
Figure 3A:
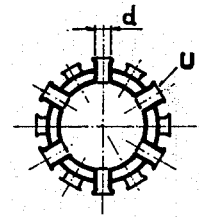

In order to better ensure this protection, the air is centrifuged onto the walls themselves via a series of vanes C placed at the slot; these vanes are schematically represented in FIG. 3b, which is a section similar to that in FIG. 3a, but now taken through the line y—y.

A non-limiting numeral example of the process performed by the device shown in FIGS. 3, 3a and 3b is given hereunder.

From a conventional converter such as known by the terms "Argon-Oxygen converter" proceed 6000 Nm/h gas of the following characteristics :
— composition:
$CO = 75.0\%$ by volume
$CO2 = 8.3\%$ by volume
$Ar+N2 = 16.7\%$ by volume
— temperature:
1750° C.

The inside diameter D of the duct 2 is of 1000 mm; there are provided 48 nozzles U having $d=80$ mm disposed in four circumferential crowns. The nozzles U are offset from a crown to the other. Through these nozzles 10,000 Nm $3/h$ air are sucked in, whilst from the opening FA' about 8,000 Nm3/$h$ air for protection of the walls are sucked in. The vanes C are provided in a number of 24 with a pitch of 15° and are inclined 30°.

The length of the combustion area is of about 1900 mm (corresponding to 1.90 diameters of the duct 2).

In FIG. 4 there is represented another embodiment form of the duct 2, which is a most suitable example for burning gases preferably with a CO content under 50% by volume.

The gas proceeding from the furnace 1 through the mouth 30 is again sucked in via the duct 2 by the end fan 7, so that the interior of said duct is below atmospheric pressure.

According to an advantageous aspect of the invention, the air is now sucked in, in a quantity being almost equal therebetween, but partly through a pipe Tu of diameter $d$ and partly through the annular slot FA'.

The latter is now displaced downstream of Tu.

As may be seen in FIG. 4a, which is a section along the line x—x in FIG. 4, the slot FA' is provided with special vanes C', imparting a rotary motion to the air flowing in, which is thus centrifuged on the inner walls of the duct 2 with a view to providing an effective protection of the walls themselves.

The gas "g" is instead forced into a circular crown Z of length L and inside diameter being approximately equal to $d$ (FIG. 4a).

It has been found that it is particularly advantageous that the value of the ratio $D-d/2 D$ be comprised between 0.10 and 0.35, corresponding to the value of the ratio $d/D$, comprised between 0.085 and 0.3.

The pipe Tu of diameter d may be obviously replaced in practice by a coaxial hole of equivalent diameter, directly drilled in the wall of the duct.

A non-limiting numeral example of the device represented in FIGS. 4 and 4a is given below.

From the electrical furnace 1, via the specially provided mouth 30, outflow 9,000 Nm3/h gas having the following characteristics:
— composition:
CO = 33.3% by volume
CO2 = 22.2% by volume
N2+Ar = 44.5% by volume
— temperature:
approx. 1700° C.

From the pipe Tu about 9250 Nm3/h air are sucked in and from the opening FA' some further 9250 Nm3/h are sucked in. The inside diameter D of the duct 2 is of 1000 mm, whilst the inside diameter of the pipe Tu is of 475 mm.

The vanes C are provided in a number of 24, have a pitch of 15° and inclined 30°. The length of the combustion area is of approximately 2.4 m, corresponding to about 2.4 diameters of the duct 2.

FIGS. 5 and 5a show a particularly advantageous embodiment. The combustion air proceeds from a double feed which includes a pipe Te which is external to the elbow connection Rg of the duct 2. The pipe Te has the same axis as the collecting duct 2 and has an inside diameter "d" which is small compared to the inside diameter "D" of the duct 2.

At the ingress or inside the pipe Te there is now, according to this invention, also inserted an air distributor Ra; as may be seen in FIG. 5a, Ra is preferably a grid Gd, consisting of a circular crown Cc and a series of ribs Cs (in the represented case they are provided in a number of three). This simple type of grid as well as other possible types may be made out of any material whatsoever; preferably, the grid Gd consists of metal or, more advantageously, of refractory material (bricks).

It has been found that by the adoption of a grid-shaped air distributor Ra it is possible to substantially minimize the danger of having inside the combustion duct a section in which the gas proceeding from the furnace is not mixed with air. By using the grid "Gd" there is now an excellent mixing of the air with the gas and the possibility of avoiding the inconveniences due to the fact that in the curved sections, whilst the central air (e.g. proceeding via Tu) has a tendency to move towards the larger radius wall, the gas has a tendency to accumulate towards the smaller radius wall, so that in the curved sections there occurs a demixing of the two fluids.

By means of the grid-shaped distributor Ra with well distributed and spaced ribs there is a distribution and mixing of the air with the gas, being practically homogeneous and constant and hence a combustion with marked reduction of the flame length even in the curved sections of the duct 2. A further advantage of the arrangement of the pipe Te fully outside the elbow connection Rg of the duct 2 is that the combustion area starts already at 35, namely it extends over the entire inner volume of Rg and duct 2, so that ultimately the length of the duct 2 may now be still reduced. The inner walls of the duct 2 are again protected by the air flowing in via FA' to which a rotary motion of the vanes is imparted.

According to another aspect of the invention, FIG. 5 represents an advantageous embodiment form in case the duct 2 has to be tangentially connected to the tower T; there is no longer substantially a vertical upward ascent of the burnt gases.

Inasmuch as the gases now flow up by running a spiral as indicated by Ug, the water is caused to outflow from a pipe 22, provided with nozzles, so as to be directed according to the dashed lines $1_l$ to $1n$ from 22 towards the walls Pi of T and in such a way as to meet in crossed current with the gases Ug. The gases G1 at the end of their ascending path are being sucked into the Venturi scrubber 15 - 9 - 11 - 16 located outside.

Inside the tower there is always the grid GR, but the excess water is caused to flow to the pit PO via the chute and the pipe 40, whilst the washing water is collected by the chute 39 and the pipe 41. In the pit PO there will still be ram B1. It is apparent that the adoption of the system 22 - Ug 15, 38 - 39 and PO, namely of the crossed current and cyclonic scrubber is not strictly bound to the solution of the outside pipe Te, but may be performed also by the other embodiment forms given in FIGS. 3 and 4.

By the double air feed of this invention it has been possible to convert a normal duct to an effective gas combustion chamber, thereby obtaining among other things the following advantages:
— drastic reduction in length of the gas suction and combustion duct 2 as a consequence of the shorter flame length;
— marked reduction of incrustations deriving from the condensation of metal vapors to the reduced condition on the inner walls of the duct 2 (and related maintenance charges) as a consequence of the more rapid CO elimination, as well as of the protection obtained from the layer of centrifuged air on the walls themselves;
— appreciable reduction in the plant and operation costs due to the smaller air excess as necessary to ensure a full gas combustion.

Due to the really critical choice of the characteristic measures of the invention and above all the double air feed system depending on the CO content in the gaseous current there is surprisingly obtained a sharp reduction in the flame length and a stronger protection of the inner walls in the duct and combustion.

Moreover the combustion by means of the double feed system together with the measures of the fitting of the short combustion duct into the lower portion of the saturation area of the tower perpendicular to the axis of the latter or tangentially to the outer wall (effect : gas-water counter-current or crossed current), of the displacement to the outside of the Venturi scrubber with a strong elbow in the lower gas re-introduction area (effect : pre-separation of the drops by deviation), of the re-insertion of the gas into the separator tangentially to the inner walls (effect : fine separation of the droplets by centrifugation), of the adoption of the funnel I or chutes 38 and 39 in the separator itself with or without grid GR, bring about an extremely efficient process with a most compact, versatile, economical and flexible equipment of long lifetime. As a matter of fact, the tremendous reduction in length of the duct 2, now showing a smaller number of bends as well as its reational coupling with the saturator ensure the installation of cleaning plants for furnaces without adequate spaces. Further the ease of maintenance of the Venturi scrubber, now placed in an easily accessible position and the elimination of scarcely accessible auxiliary mechanical means in the embodiment of the cyclone-separator should now be emphasized.

The invention has been described and represented with the aid of the embodiments illustrated in the accompanying drawings, but it is, of course, understood that several changes and modifications may be introduced therein, without departing from the very spirit of this invention. It is likewise understood that any such changes and modifications shall be deemed as falling into the protection scope of this invention.

What is claimed is:

1. A process for treating combustible gas carrying suspended solid particles wherein the gas and suspended particles pass from a furnace zone into a duct in which the gas undergoes combustion with induced air while passing to a further treatment zone the steps comprising: introducing a flow of air through an annular opening in the duct located near the downstream end thereof and imparting a rotary motion to said flow of air about the axis of the duct to thereby centrifugally form a protective air layer along the inner surface of the duct, introducing other air into the duct near the downstream end thereof whereby combustion of the gas is effected in the duct; passing the gas into contact with a spray of wash liquid in the upper portion of a chamber to remove at least some solid particles from the gas, the gas having a substantial component of movement which is counter current to the direction of the spray; passing the gas out of the upper portion of the chamber to a venturi scrubber; injecting further wash liquid into the gas in the scrubber whereby wash liquid particles become suspended in the gas; passing the gas and suspended wash liquid particles out of the scrubber along a curved path to thereby remove some of the suspended liquid particles by centrifugal force; then passing the gas and remaining suspended particles tangentially into a different portion of said chamber to thereby remove the remainder of the suspended liquid particles by centrifugal force.

2. A process as in claim 1 wherein said other air is introduced into the duct in the form of a plurality of radial streams flowing in directions perpendicular to the direction of gas flow through the duct.

3. A process as in claim 1 wherein said other air is introduced into the duct in the form of a stream flowing into the duct in a direction co-axial with the direction of gas flow through the duct such that the gas flows in annular form surrounded interiorly and exteriorly by air.

* * * * *